(12) United States Patent
Dwarakanath et al.

(10) Patent No.: US 9,584,737 B2
(45) Date of Patent: Feb. 28, 2017

(54) SYSTEM FOR PROVISION OF SUPPORTING CONTENT

(71) Applicant: Intel Corporation, Santa Clara, CA (US)

(72) Inventors: Kumar N. Dwarakanath, Folsom, CA (US); Moorthy Rajesh, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/582,245

(22) Filed: Dec. 24, 2014

(65) Prior Publication Data
US 2016/0191821 A1 Jun. 30, 2016

(51) Int. Cl.
H04N 5/278 (2006.01)
H04N 5/44 (2011.01)
H04N 7/088 (2006.01)
H04N 21/462 (2011.01)
H04N 21/43 (2011.01)

(52) U.S. Cl.
CPC ........... H04N 5/278 (2013.01); H04N 5/4401 (2013.01); H04N 7/0882 (2013.01); H04N 21/4622 (2013.01); H04N 21/4307 (2013.01)

(58) Field of Classification Search
CPC ............. H04N 7/0882; H04N 21/4883; H04N 13/0497; H04N 5/278; H04N 5/4401; H04N 21/4307; H04N 21/4622
USPC ....................................................... 348/468
See application file for complete search history.

(56) References Cited

U.S. PATENT DOCUMENTS

| 6,005,536 A | 12/1999 | Beadles et al. |
| 8,430,310 B1 | 4/2013 | Ho et al. |
| 8,736,761 B2 | 5/2014 | Kendall et al. |
| 2002/0101537 A1 | 8/2002 | Basson et al. |

(Continued)

FOREIGN PATENT DOCUMENTS

WO 2013187562 12/2013

OTHER PUBLICATIONS

Rood, Rachel, "New Closed-Captioning Glasses Help Deaf Go Out to the Movies," NPR—All Tech Considered, May 12, 2013, 4 pages, United States.

(Continued)

Primary Examiner — Michael Lee
(74) Attorney, Agent, or Firm — Grossman, Tucker, Perreault & Pfleger, PLLC

(57) ABSTRACT

The present disclosure is directed to a system for provision of supporting content (SC). In general, a device may utilize event information to request SC from an SC provider, and may then present the SC concurrently with an occurrence of the event. The event information may comprise at least an event identifier and a SC provider locator. In response to the request, the SC provider may provide SC configuration data to the device. The SC configuration data may include at least a time, date and location data for the occurrence of the event. At least the time, date and location data may be used to identify an occurrence of the event, upon which the device may synchronize with a start time of the occurrence of the event. The SC may be provided to the device prior to the event or may be streamed during the occurrence of the event.

15 Claims, 3 Drawing Sheets

(56) References Cited

U.S. PATENT DOCUMENTS

| | | | |
|---|---|---|---|
| 2014/0267399 A1* | 9/2014 | Zamer | G06T 11/00 |
| | | | 345/633 |
| 2014/0278346 A1 | 9/2014 | Zomet et al. | |
| 2015/0015784 A1* | 1/2015 | Minnick | G06K 9/00288 |
| | | | 348/468 |
| 2015/0312533 A1* | 10/2015 | Moharir | H04N 7/185 |
| | | | 348/14.02 |
| 2015/0317569 A1* | 11/2015 | Renaudie | G06Q 10/02 |
| | | | 705/5 |

OTHER PUBLICATIONS

International Search Report and Written Opinion from related application PCT/US2015/063860 mailed May 26, 2016.
Taiwanese Office Action and Search Report issued in Taiwanese Application No. 104138747, dated Oct. 18, 2016, with English translation of Search Report.

* cited by examiner

SYSTEM FOR PROVISION OF SUPPORTING CONTENT

TECHNICAL FIELD

The present disclosure relates to electronic communication, and more particularly, to a system for obtaining supporting content and causing a device to present the supporting content.

BACKGROUND

Modern technology has helped to improve society most apparently by making everyday tasks easier to complete. However, this is just one benefit that people may realize from modern technology. People with language barriers, people with disabilities, etc. have faced challenges in the past that may have discouraged them from participating in certain activities. For example, non-native language speakers, hearing-impaired people, vision-impaired people, etc. may desire to see a movie in a movie theatre or attend a live event, and may find themselves at an immediate disadvantage because they cannot fully appreciate the presentation. Technological developments like closed-captioning, sound-amplifying listening devices, wireless transmission of enhanced audio soundtracks, etc., have helped to improve the experience by expanding the presentation of large-scale events to accommodate a variety of language speakers, hearing or vision-impairment, etc. However, these enhancement systems have limitations that may not make them appropriate for live venues. For example, a movie theatre may hesitate to present a general admission movie with closed-captioning because it may disrupt the experience of other patrons. Moreover, it may be difficult to provide enhanced audio (e.g., audio in an alternative language or that may provide information about what action may be occurring in conjunction with the audible portion of the presentation) when the presentation is live due to the need to account for unexpected events in the live presentation, to precisely synchronize the timing of the enhanced audio program, etc.

At least one solution has been developed to allow a larger audience to enjoy movies and other similar programs. A device including visual and/or audible enhancement may be provided to patrons as part of a venue-based system for delivering closed-captioning, enhanced audio, etc. A device may include, for example, an eyeglass-like portion with lenses onto which text may be projected. The text may seem to appear in midair wherever the wearer is looking, and may narrate or explain aspects of the presentation in the same or another language. In the same or a separate device, a headphone system may provide enhanced audio that may provide dialog in another language, may help to explain action that is occurring in the presentation but may not be visible to the user, etc. While the benefits may be readily apparent, these systems may be a challenge to implement. Existing solutions run on proprietary equipment/software that must be purchased, installed, distributed, collected, maintained, etc. by event-presenting venues. The resulting costs may be prohibitive, especially to smaller venues. Moreover, visual and/or audible content must be developed for each new event (e.g., for new movies, shows, etc.), which places further burden on the venues.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
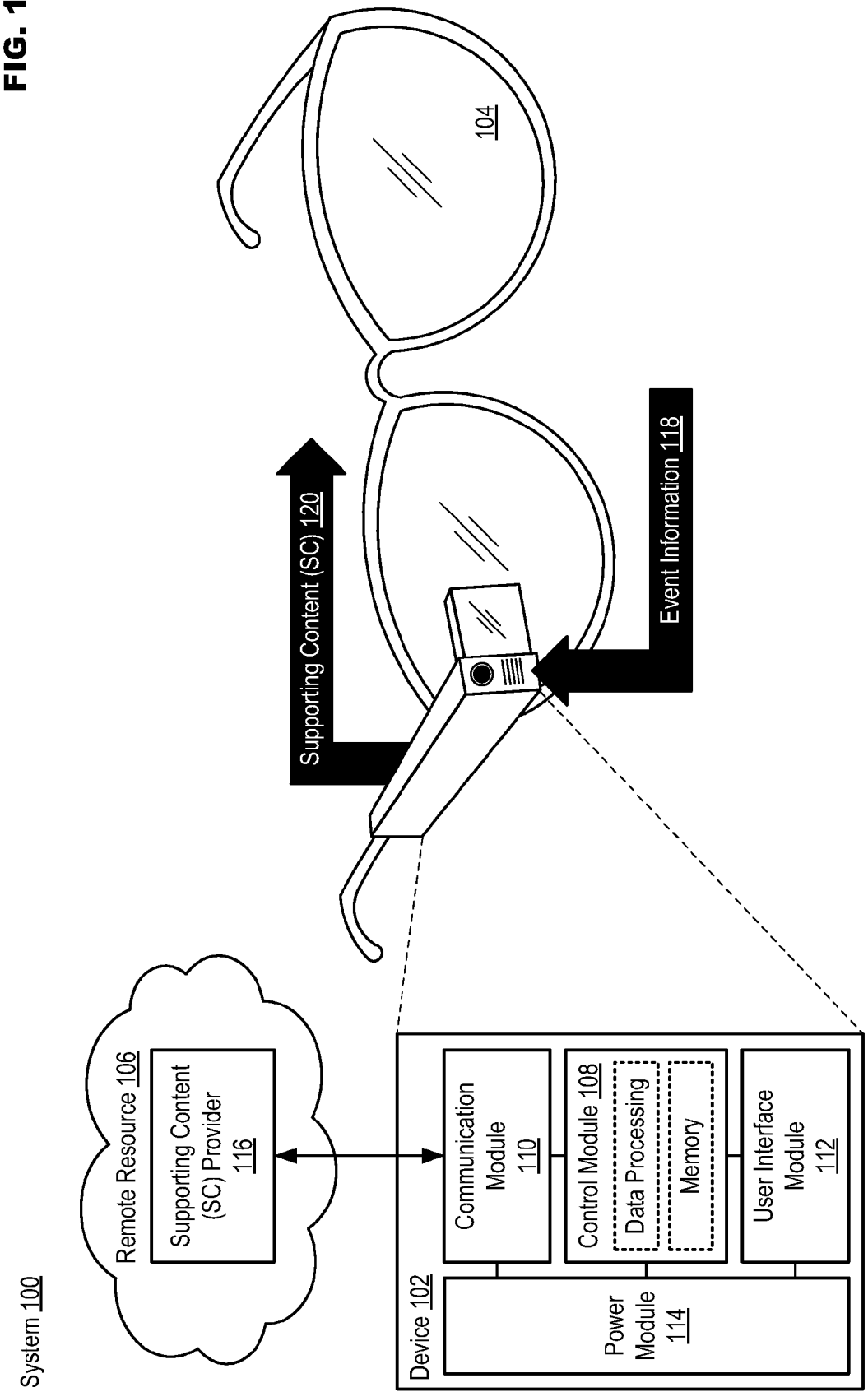
FIG. 1 illustrates an example system for provision of supporting content in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The present disclosure is directed to a system for provision of supporting content (SC). In general, a device may utilize event information to request SC from an SC provider, and may then present the SC concurrently with an occurrence of the event. The device may be part of a device assembly in, for example, an eyeglass-type wearable device. The event information may comprise at least an event identifier and a SC provider locator. In response to the request, the SC provider may provide SC configuration data to the device, the SC configuration data including at least time, date and location data for the occurrence of the event. The device may use at least the time, date and location data to identify an occurrence of the event, upon which the device may synchronize the presentation of the SC with a start time of the occurrence of the event. In at least one example implementation, the SC may be provided to the device prior to the event, and may be presented from the device's memory. The SC may also be streamed during the occurrence of the event. Regardless of how the SC is received in the device, the SC may then be presented concurrently with the occurrence of the event, and may comprise, for example, at least one of closed captioning for the audibly impaired or enhanced audio content for the visually impaired.

In at least one embodiment, a device configured for the provision of supporting content may comprise, for example, a communication module, a user interface module, and a control module. The communication module may be to interact with at least a supporting content provider. The user interface module may be to at least receive event information and present supporting content. The control module may be to cause the user interface module to receive event information corresponding to an event and cause the communication module to transmit at least a portion of the event information to the supporting content provider. The control module may further be to receive at least supporting content configuration data from the supporting content provider via the communication module and cause the user interface module to present the supporting content concurrently with an occurrence of the event based at least on the supporting content configuration data.

In receiving the event information the user interface module may be to, for example, optically scan the event information from printed media corresponding to the occurrence of the event. The communication module may be to transmit an event identifier received in the event information to the supporting content provider. The control module may be to identify the occurrence of the event based at least on time, date and location data corresponding to the occurrence of the event, the time data and location data being received in the supporting content configuration data. The control module may further be to synchronize the presentation of the supporting content to a start time of the occurrence of the event.

In at least one embodiment, the control module may be to receive the supporting content in the device via the communication module prior to the occurrence of the event. Alternatively, the control module may be to cause the communication module is to receive a stream of the supporting content during the occurrence of the event. The supporting content may comprise, for example, at least one of closed captioning or enhanced audio content. In at least one example implementation, the device may be part of a device assembly wearable as eyewear. Consistent with the present disclosure, an example method for provision of supporting content may comprise receiving event information at a device, the event information corresponding to an event, transmitting at least a portion of the event information from the device to a supporting content provider, receiving at least supporting content configuration data from the supporting content provider at the device and presenting the supporting content with the device based at least on the supporting content configuration data, the supporting content being presented concurrently with an occurrence of the event.

FIG. 1 illustrates example system 100 for provision of supporting content in accordance with at least one embodiment of the present disclosure. System 100 may comprise, for example, device 102, which in the example of FIG. 1 is shown integrated with optical apparatus 104, and remote resource 106. The combination of device 102 and optical apparatus 104 may correspond to a "wearable" optical computing device such as Google Glass™ from the Google Corporation. While this example configuration may be useful for explaining various embodiments consistent with the present disclosure, these embodiments are not limited to implementation only using the configuration disclosed in FIG. 1. For example, optical apparatus 104 may comprise a wearable user interface providing basic access control and content presentation functionality, but may rely on a separate device 102 (e.g., to which it may be coupled via wired communication, short-range wireless communication, etc.) for data processing, data storage, long-range communications, etc. In such an implementation, separate device 102 may be, for example, a mobile communication device such as a cellular handset or a smartphone based on the Android® OS from the Google Corporation, iOS® from the Apple Corporation, Windows® OS from the Microsoft Corporation, Mac OS from the Apple Corporation, Tizen OS from the Linux Foundation, Firefox OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle Fire® from the Amazon Corporation, etc., an Ultrabook® including a low-power chipset manufactured by Intel Corporation, a netbook, a notebook, a laptop, a palmtop, etc., a typically stationary computing device such as a desktop computer, a server, a smart television, small form factor computing solutions (e.g., for space-limited applications, TV set-top boxes, etc.) like the Next Unit of Computing (NUC) platform from the Intel Corporation, etc. Regardless, device 102 and optical apparatus 104, as illustrated in FIG. 1, are presented only for the sake of explanation, and are not meant to limit the various embodiments to any particular manner of implementation.

Device 102 may be coupled to optical apparatus 104 so that device 102 may be wearable by the user. While optical apparatus 104 has been disclosed including lenses, lenses may only be required in certain cases (e.g., when the wearer requires prescription eyewear, when device 102 is configured to display information reflected on the lenses, etc.). Device 102 may comprise, for example, control module 108, communication module 110, user interface module 112 and power module 114. While modules 108 to 114 have been disclosed as separate entities, the features of some or all of modules 108 may be combined together to, for example, save space in device 102.

Control module 108 may comprise at least data processing and memory resources. Data processing resources may comprise, for example, one or more processors situated in separate components, or alternatively one or more processing cores embodied in a component (e.g., in a System-on-a-Chip (SoC) configuration), and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Quark, Core i-series, product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) to provide an interface through which the data processing resources may interact with other system components that may be operating at different speeds, on different buses, etc. in device 102. Some or all of the functionality commonly associated with the support circuitry may also be included in the same physical package as the processor (e.g., such as in the Sandy Bridge family of processors available from the Intel Corporation). The data processing resources may be configured to execute various instructions in device 102. Instructions may include program code configured to cause the data processing resources to perform activities related to reading data, writing data, processing data, formulating data, converting data, transforming data, etc. Information (e.g., instructions, data, etc.) may be stored in the memory resources. The memory resources may comprise random access memory (RAM) or read-only memory (ROM) in a fixed or removable format. RAM may include volatile memory configured to hold information during the operation of device 102 such as, for example, static RAM (SRAM) or Dynamic RAM (DRAM). ROM may include non-volatile (NV) memory modules configured based on BIOS, UEFI, etc. to provide instructions when device 102 is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Communication module 110 may manage communications-related operations for device 102, which may include resources configured to support wired and/or wireless communications. Device 102 may comprise more than one communication module 110 (e.g., including separate physical interface modules for wired protocols and/or wireless radios). Wired communications may include serial and parallel wired mediums such as, for example, Ethernet, Universal Serial Bus (USB), Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth, WLAN, Wi-Fi, etc.), long range wireless mediums (e.g., cellular wide-area radio communication technology, satellite-based communications, etc.), electronic communications via sound waves, etc. In one embodiment, communications module 110 may be configured to prevent wireless communications from interfering with each other. In performing this function, communications module 110 may schedule communication activities based on, for example, the relative priority of messages awaiting transmission.

User interface module 112 may include hardware and/or software to allow users to interact with device 102 such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware in user interface module 112 may be incorporated within device 102 and/or may be coupled to device 102 via a wired or wireless communication medium. Power module 114 may include internal power sources (e.g., battery, fuel cell, etc.) and/or external power sources (e.g., power grid, electromechanical or solar generator, external fuel cell, etc.) and related circuitry configured to supply device 102 with the power needed to operate.

Remote resource 106 may comprise at least one computing device configured to provide functionality associated with SC provider 116. Remote resource 106 may be accessible to device 102 via a local-area network (LAN), wide-area network (WAN) like the Internet, a global-area network (GAN), etc. For example, remote resource 106 may comprise one or more data servers configured to work alone or in unison in a cloud computing architecture to provide functionality associated with SC provider 116. SC provider 116 may be associated with various entities such as, for example, an entity that creates events (e.g., a movie production studio, a television studio, theatrical arts producer, a sporting events promoter, etc.), a venue (e.g., a movie theatre, concert hall, convention center, etc.), or a third party that provides supporting content as a service (e.g., a company with a business providing supporting content to event creators, venue owners, etc.).

In an example of operation, an occurrence of an event (e.g., a movie, television program, sporting event, theatrical performance, concert, opera, lecture, rally, etc.) may be scheduled for presentation. As referenced herein, an "occurrence" may indicate a particular presentation (e.g., the 8:00 PM showing of a movie). Initially device 102 may receive event information 118. For example, a patron may buy a ticket to the occurrence of the event, the ticket including scannable Data including event information 118, or at least indicating where event information 118 may be obtained with, for example, a universal resource locator (URL). Alternatively, event information 118 may be obtained through user interaction with device 102. For example, a user may indicate to device 102 through speech, manual input, etc. the occurrence of the presentation (e.g., the user may tell device 102 the date, time and location of the occurrence of the event, may read a code to device 102 printed on tickets, advertisements, provided by the venue, etc.). Device 102 may then request SC 120 from SC provider 116 in remote resource 106. An example of the data that may be exchanged during this interaction will be disclosed in FIG. 2. The manner of communication utilized between device 102 and SC provider 116 may depend on the particular implementation. For example, if remote resource 106 is a server operating locally at the venue, device 102 and SC provider 116 may communicate via wireless LAN (WLAN), Bluetooth connection, etc. Remote resource 106 may also be configured in a cloud computing architecture. While device 102 may still access localized resources (e.g., wireless AP) as a gateway to the Internet and SC provider 116, it may also be possible for device 102 to utilize a long-range wireless data connection (e.g., a long-term evolution (LTE) connection) to interact (e.g., when localized access is not available).

SC provider 116 may then determine whether SC can be provided for the occurrence of the event. In general, it may be that no SC 120 exists for the occurrence of the event or has not yet been generated. In at least one embodiment, SC provider 116 may provide SC 120 as a for-profit service, and SC provider 116 must first make a determination that the requestor has paid for SC 120, subscribed to the service, etc. prior to SC 120 being delivered to the requestor. SC provider 116 may cause device 102 to present a login interface, purchase interface, subscription interface, etc. (e.g., via an application running on device 102) allowing the user of device 102 to rightfully obtain SC 120. Providing that SC 120 exists for the occurrence of the event and SC provider 116 determines that the requestor is entitled to receive SC 120, device 102 may then receive SC 120 and may present SC 120 concurrently with the occurrence of the event. Example operations, communications, data, etc. that may be involved with configuring device 102 for the presentation of SC 120 will be discussed in regard to FIGS. 2 and 3. The presentation of SC 120 may comprise, for example, device 102 presenting closed captioning for the audibly impaired, and/or enhanced audio content for the visually impaired, corresponding to the occurrence of the event. In at least one embodiment, the closed captioning may be displayed on a viewing portion of device 102, may be projected on at least one lens of optical apparatus 104 by device 102 or by transmission to a user interface within optical apparatus 104, etc. Sound for the enhanced audio content may be generated by at least one speaker in device 102, by audio reproduction equipment (e.g., headphones) coupled to device 102 via a wired or wireless communication medium, etc. While the examples of SC 120 have been presented herein as suitable for containing material for assisting people with disabilities, this is not the only use for SC 120 consistent with the present disclosure. For example, SC 120 may also comprise material of interest to fully-abled people including text and/or audio that may further explain the event or enhance the event experience. For example, people with language barriers (e.g., non-native language speakers) may benefit in that SC 120 may comprise, for example, alternative language closed captioning, soundtracks, etc.

Figure 2:
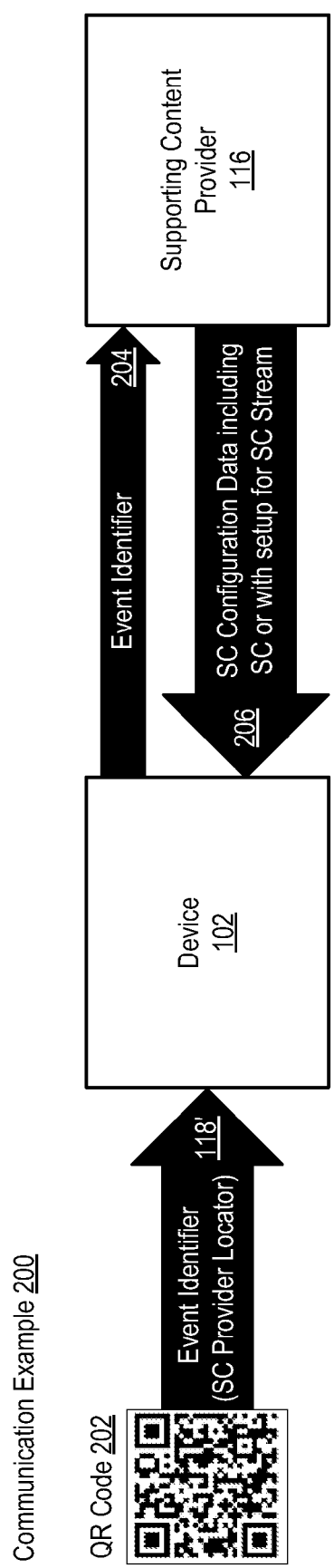
FIG. 2 illustrates examples of data that may be exchanged in accordance with at least one embodiment of the present disclosure.

FIG. 2 illustrates example 200 of data that may be exchanged in accordance with at least one embodiment of the present disclosure. Communication example 200 depicts how data may flow during the operation of system 100. While various messages containing particular data are shown, example 200 is presented merely for the sake of explanation, and is not intended to limit embodiments consistent with the present disclosure to any particular manner of implementation.

In example 200 QR code 202 may be scanned to obtain event information 118' that may comprise, for example, at least an event identifier to communicate the precise event that a user of device 102 desires to attend (e.g., the 8:00 PM showing of a certain movie at a particular venue). QR code 202 may be printed on, for example, a ticket for the occurrence of an event, advertising for the event, programs, playbills, materials associated with the particular venue, a webpage, etc. In at least one embodiment, event information 118' may further comprise an SC provider locator and other data. The SC provider locator may inform device 102 where SC provider 116 may be accessed in the form of, for example, a URL. However, the SC provider locator may be optional in certain implementations wherein, for example, an application running on device 102 already knows how to interact with SC provider 116. Other data may include, for example, the abilities and/or configuration of the particular venue where the event will occur (e.g., does the particular venue have localized SC servers and/or LAN available, does the local venue subscribe to get SC 120 from SC provider 116, etc.). Device 102 may then transmit at least the event identifier to SC provider 116 in message 204. As previously mentioned, the manner by which message 204 may be transmitted may depend on the particular implementation of system 100, where device 102 and/or a user of device 102 is located when message 204 is sent (e.g., is the user employing another device such as home computer, etc., to purchase a ticket for the occurrence of the event).

Assuming that device 102 can receive SC 120 (e.g., that SC 120 exists, is available and that device 102 is entitled to receive SC 120), device 102 may then receive response message 206. In at least one embodiment, response message 206 may comprise at least SC configuration data. Example SC configuration data may comprise at least date, time and location data for the occurrence of the event. SC configuration data may be employed in device 102 for configuring parameter identification to trigger operations such as device synchronization with a start time of the occurrence of the event and presentation of SC 120. For example, communication example 200 may be initiated long before the scheduled occurrence of the event, and thus, presentation of SC 120 may not occur for some time. Device 102 needs to be aware of the future occurrence of the event so that SC 120 is presented when needed. Optionally, SC configuration data may also be used to remind a user of device 102 of the occurrence of the event, to add a reminder for the occurrence of the event to an existing schedule in device 102, etc. Response message 206 may also include SC 120. For example, SC 120 may be at least one file comprising text for closed captioning and/or enhanced audio. Alternatively, response message 206 may only include SC configuration data with SC 120 to be provided to device 102 at a later time. For example, SC 120 may be provided to device 102 by local servers in the particular venue just before the start time of the occurrence of the event, may be streamed to device 102 (e.g., transmitted gradually over time via wireless communication) concurrently during the occurrence of the event, etc.

Figure 3:
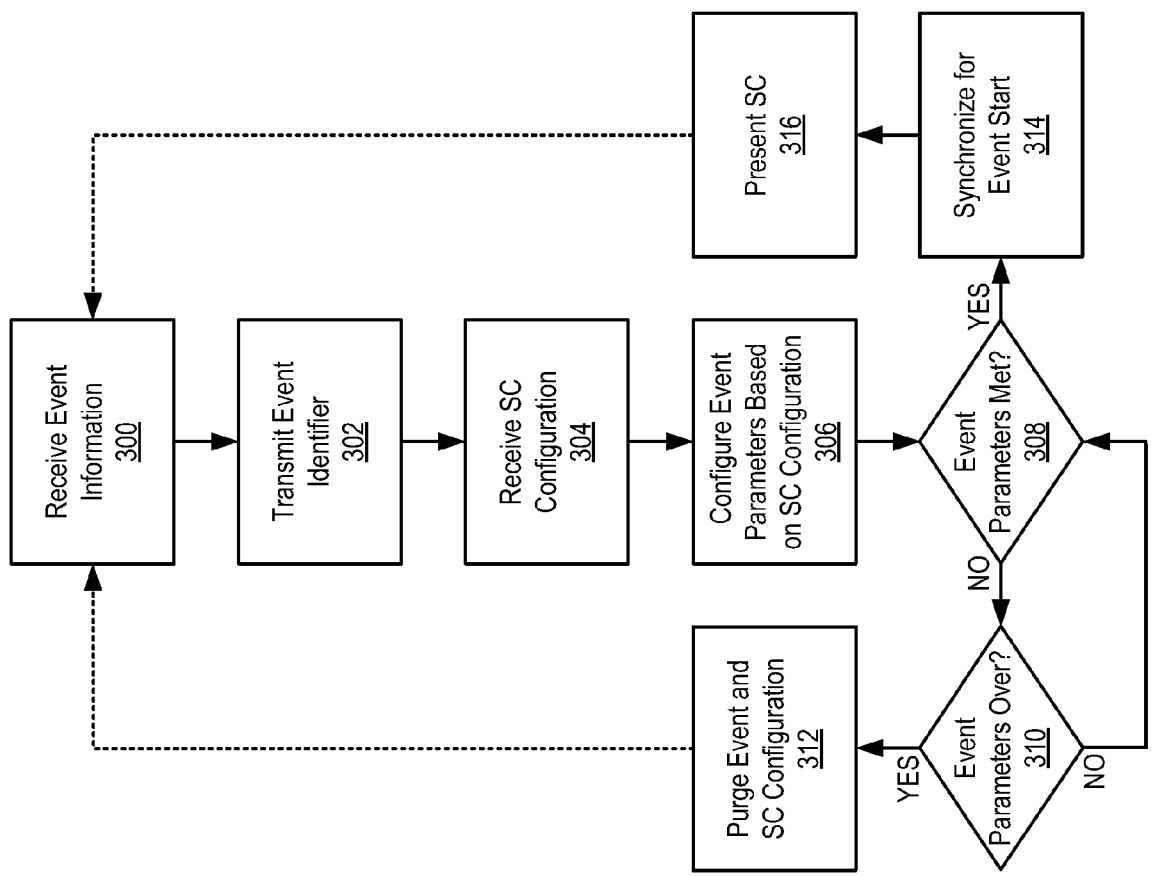
FIG. 3 illustrates example operations for provision of supporting content in accordance with at least one embodiment of the present disclosure.

FIG. 3 illustrates example operations for provision of supporting content in accordance with at least one embodiment of the present disclosure. In operation 300, event information may be received in a device. For example, the device may scan in the event information from printed media related to an occurrence of an event, a venue, etc. The device may then transmit at least the event identifier to an SC provider in operation 302. While not pictured, operations that may take place in the SC provider after receiving the event identifier from the device may comprise, for example, determining whether SC corresponding to the occurrence of the event identified by the event identifier exists, is available and whether the device/user are entitled to receive the SC.

Presuming that any operations occurring in the SC provider result in a determination that the device is entitled to receive the SC, in operation 304 at least SC configuration data may then be received in the device. The device may then proceed to configure event parameters (e.g., at least date, time and location) for the occurrence of the event in operation 306. A determination may then be made in operation 308 as to whether the event parameters have been met (e.g., is the device in a location corresponding to where the occurrence of the event will be presented on the correct date and near the time when the occurrence of the event is scheduled). A determination in operation 308 that the event parameters have not been satisfied may be followed by a further determination in operation 310 as to whether the event parameters are over (e.g., expired—has the time/date for the occurrence of the event passed?). If in operation 310 it is determined that the event parameters are over, then in operation 312 the setup for the occurrence of the event and any related SC configuration data may be purged from the device, which may optionally then be followed by a return to operation 300 to prepare for the instance event information is received.

A determination in operation 310 that the event parameters are not over may be followed by a return to operation 308. If in operation 308 it is determined that the event parameters have been met (e.g., the device is at the venue at or just before the occurrence of the event), then in operation 314 the device may synchronize for the start of the event. For example, if the SC is already on the device, the device may synchronize timing with a start time control entity (e.g., a local server in the venue, a cloud-based server, etc.) or may begin listing for a signal to begin presentation of the SC. In an example implementation wherein the SC will be streamed from a local SC provider, over a local or remote Internet connection, etc., the device may configure itself to connect to the source of the SC just prior to the start of the occurrence of the event. The SC may then be presented in operation 316 based on the synchronization established in operation 314. In at least one embodiment, in presenting the SC the device may present at least one of closed captioning for the audibly impaired or enhanced audio content for the visually impaired.

While FIG. 3 illustrates operations according to an embodiment, it is to be understood that not all of the operations depicted in FIG. 3 are necessary for other embodiments. Indeed, it is fully contemplated herein that in other embodiments of the present disclosure, the operations depicted in FIG. 3, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present disclosure is directed to a system for provision of supporting content (SC). In general, a device may utilize event information to request SC from an SC provider, and may then present the SC concurrently with an occurrence of the event. The event information may comprise at least an event identifier and a SC provider locator. In response to the request, the SC provider may provide SC configuration data to the device. The SC configuration data may include at least a time, date and location data for the occurrence of the event. At least the time, date and location data may be used to identify an occurrence of the event, upon which the device may synchronize with a start time of the occurrence of the event. The SC may be provided to the device prior to the event or may be streamed during the occurrence of the event.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for gradual context saving for data storage devices, as provided below.

According to example 1 there is provided a device configured for the provision of supporting content. The device may comprise a communication module to interact with at least a supporting content provider, a user interface module to at least receive event information and present supporting content and a control module to cause the user interface module to receive event information corresponding to an event, cause the communication module to transmit at least a portion of the event information to the supporting content provider, receive at least supporting content configuration data from the supporting content provider via the communication module and cause the user interface module to present the supporting content concurrently with an occurrence of the event based at least on the supporting content configuration data.

Example 2 may include the elements of example 1, wherein the user interface module is to optically scan the event information from printed media corresponding to the occurrence of the event.

Example 3 may include the elements of example 2, wherein the event information is scanned from a barcode or QR code.

Example 4 may include the elements of any of examples 1 to 3, wherein the communication module is to transmit an event identifier received in the event information to the supporting content provider.

Example 5 may include the elements of any of examples 1 to 4, wherein the control module is to identify the occurrence of the event based at least on time, date and location data corresponding to the occurrence of the event, the time data and location data being received in the supporting content configuration data.

Example 6 may include the elements of example 5, wherein the control module is to cause the device to schedule a reminder based on at least one of the time, date and location data corresponding to the occurrence of the event.

Example 7 may include the elements of any of examples 1 to 6, wherein the control module is to synchronize the presentation of the supporting content to a start time of the occurrence of the event.

Example 8 may include the elements of any of examples 1 to 7, wherein the control module is to receive the supporting content in the device via the communication module prior to the occurrence of the event.

Example 9 may include the elements of any of examples 1 to 8, wherein the control module is to cause the communication module is to receive a stream of the supporting content during the occurrence of the event.

Example 10 may include the elements of any of examples 1 to 9, wherein the supporting content comprises at least one of closed captioning or enhanced audio content.

Example 11 may include the elements of any of examples 1 to 10, wherein the device is part of a device assembly wearable as eyewear.

Example 12 may include the elements of any of examples 1 to 11, wherein the control module is to receive the supporting content in the device via the communication module prior to the occurrence of the event or cause the communication module is to receive a stream of the supporting content during the occurrence of the event.

According to example 13 there is provided a method for provision of supporting content, comprising receiving event information at a device, the event information corresponding to an event, transmitting at least a portion of the event information from the device to a supporting content provider, receiving at least supporting content configuration data from the supporting content provider at the device and presenting the supporting content with the device based at least on the supporting content configuration data, the supporting content being presented concurrently with an occurrence of the event.

Example 14 may include the elements of example 13, wherein receiving the event information comprises optically scanning the event information from printed media corresponding to the occurrence of the event.

Example 15 may include the elements of example 14, wherein the event information is scanned from a barcode or QR code.

Example 16 may include the elements of any of examples 13 to 15, wherein transmitting at least a portion of the event information comprises transmitting an event identifier received in the event information to the supporting content provider.

Example 17 may include the elements of any of examples 13 to 16, and may further comprise identifying the occurrence of the event based at least on time, date and location data corresponding to the occurrence of the event, the time data and location data being received in the supporting content configuration data.

Example 18 may include the elements of example 17, and may further comprise scheduling a reminder in the device based on at least one of the time, date and location data corresponding to the occurrence of the event.

Example 19 may include the elements of any of examples 13 to 18, and may further comprise synchronizing the presentation of the supporting content to a start time of the occurrence of the event.

Example 20 may include the elements of any of examples 13 to 19, and may further comprise receiving the supporting content in the device prior to the occurrence of the event.

Example 21 may include the elements of any of examples 13 to 20, and may further comprise receiving a stream of the supporting content in the device during the occurrence of the event.

Example 22 may include the elements of any of examples 13 to 21, wherein the supporting content comprises at least one of closed captioning or enhanced audio content.

Example 23 may include the elements of any of examples 13 to 22, and may further comprise receiving the supporting content in the device prior to the occurrence of the event or receiving a stream of the supporting content in the device during the occurrence of the event.

According to example 24 there is provided a system for provision of supporting content including at least a device, the system being arranged to perform the method of any of the above examples 13 to 23.

According to example 25 there is provided a chipset arranged to perform the method of any of the above examples 13 to 23.

According to example 26 there is provided at least one machine readable medium comprising a plurality of instructions that, in response to be being executed on a computing device, cause the computing device to carry out the method according to any of the above examples 13 to 23.

According to example 27 there is provided a device configured for provision of supporting content, the device being arranged to perform the method of any of the above examples 13 to 23.

According to example 28 there is provided a system for provision of supporting content. The system may comprise means for receiving event information at a device, the event information corresponding to an event, means for transmitting at least a portion of the event information from the device to a supporting content provider, means for receiving at least supporting content configuration data from the supporting content provider at the device and means for presenting the supporting content with the device based at least on the supporting content configuration data, the supporting content being presented concurrently with an occurrence of the event.

Example 29 may include the elements of example 28, wherein the means for receiving the event information comprise means for optically scanning the event information from printed media corresponding to the occurrence of the event.

Example 30 may include the elements of example 29, wherein the event information is scanned from a barcode or QR code.

Example 31 may include the elements of any of examples 28 to 30, wherein the means for transmitting at least a portion of the event information comprise means for transmitting an event identifier received in the event information to the supporting content provider.

Example 32 may include the elements of any of examples 28 to 31, and may further comprise means for identifying the occurrence of the event based at least on time, date and location data corresponding to the occurrence of the event, the time data and location data being received in the supporting content configuration data.

Example 33 may include the elements of example 32, and may further comprise means for scheduling a reminder in the device based on at least one of the time, date and location data corresponding to the occurrence of the event.

Example 34 may include the elements of any of examples 28 to 33, and may further comprise means for synchronizing the presentation of the supporting content to a start time of the occurrence of the event.

Example 35 may include the elements of any of examples 28 to 34, and may further comprise means for receiving the supporting content in the device prior to the occurrence of the event.

Example 36 may include the elements of any of examples 28 to 35, and may further comprise means for receiving a stream of the supporting content in the device during the occurrence of the event.

Example 37 may include the elements of any of examples 28 to 36, wherein the supporting content comprises at least one of closed captioning or enhanced audio content.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A wearable device configured for the provision of supporting content, comprising:
communication circuitry;
user interface circuitry to at least receive event information and present supporting content associated with a movie; and
control circuitry to:
cause the user interface circuitry to receive the event information from a printed medium corresponding to the movie, the event information comprising information corresponding to a supporting content provider and an event identifier including information that identifies the movie;

cause the communication circuitry to transmit at least the event identifier to the supporting content provider, the supporting content provider providing, based, at least in part, on the event identifier received from the printed medium, the supporting content associated with the movie and supporting content configuration data;

receive at least the supporting content associated with the movie and the supporting content configuration data from the supporting content provider via the communication circuitry, wherein the supporting content includes at least one of closed captioning data or enhanced audio content data and wherein the supporting content configuration data includes parameters identifying a time, a date, and a location of the event;

determine whether each of the parameters have been satisfied or have expired;

when it is determined that all of the parameters have been satisfied, cause the user interface circuitry to present the supporting content with the wearable device concurrently with an occurrence of the movie; and when it is determined that one or more parameters are expired, purge the supporting content configuration data from the wearable device.

2. The device of claim 1, wherein the control circuitry is further configured to synchronize the presentation of the supporting content to a start time of the occurrence of the movie.

3. The device of claim 1, wherein the control circuitry is further configured to cause the communication circuitry to receive the supporting content and to store the supporting content in the device prior to the occurrence of the movie.

4. The device of claim 1, wherein the control circuitry is further configured to cause the communication circuitry to receive a stream of the supporting content during the occurrence of the movie.

5. The device of claim 1, wherein the wearable device comprises eyewear.

6. A method for provision of supporting content associated with a movie, comprising, with a wearable device:

receiving event information from a printed medium corresponding to the movie, the event information comprising information corresponding to a supporting content provider and an event identifier including information that identifies the movie;

transmitting the event identifier from the wearable device to the supporting content provider, the supporting content provider providing, based, at least in part, on the event identifier received from the printed medium, the supporting content associated with the movie and supporting content configuration data;

receiving at least the supporting content associated with the movie and the supporting content configuration data from the supporting content provider, wherein the supporting content includes at least one of closed captioning data or enhanced audio content data and wherein the supporting content configuration data includes parameters identifying a time, a date, and a location of the event;

when it is determined that all of the parameters have been satisfied, presenting the supporting content with the wearable device, the supporting content being presented concurrently with an occurrence of the movie; and when it is determined that one or more parameters are expired, purging the supporting content configuration data from the wearable device.

7. The method of claim 6, wherein:

receiving the event information comprises optically scanning the event information from the printed medium.

8. The method of claim 6, further comprising:

synchronizing the presentation of the supporting content to a start time of the occurrence of the movie.

9. The method of claim 6, further comprising:

receiving the supporting content in the device prior to the occurrence of the movie.

10. The method of claim 6, further comprising:

receiving a stream of the supporting content in the device during the occurrence of the movie.

11. At least one non-transitory machine-readable storage medium having stored thereon, individually or in combination, instructions for provision of supporting content associated with a movie that, when executed by one or more processors of a wearable device, cause the one or more processors to perform the following operations comprising:

receive event information from a printed medium corresponding to the movie with the wearable device, the event information comprising information corresponding to a supporting content provider and an event identifier that identifies the movie;

transmit at least the event identifier from the wearable device to the supporting content provider, the supporting content provider providing, based, at least in part, on the event identifier received from the printed medium, the supporting content associated with the movie and supporting content configuration data;

receive at least the supporting content configuration data and the supporting content associated with the movie from the supporting content provider with the wearable device, wherein the supporting content includes at least one of closed captioning data or enhanced audio content data and wherein the supporting content configuration data includes parameters identifying a time, a date, and a location of the event;

when it is determined that all of the parameters have been satisfied, present the supporting content with the wearable device, the supporting content being presented concurrently with an occurrence of the movie; and when it is determined that one or more parameters are expired, purge the supporting content configuration data from the wearable device.

12. The non-transitory medium of claim 11, wherein the instructions to receive the event information comprise instructions to cause the wearable device to:

optically scan the event information from the printed medium corresponding to the occurrence of the movie.

13. The non-transitory medium of claim 11, further comprising, instructions that, when executed by one or more processors of the wearable device, cause the one or more processors to:

synchronize the presentation of the supporting content to a start time of the occurrence of the movie.

14. The non-transitory medium of claim 11, further comprising, instructions that, when executed by one or more processors of the wearable device, cause the one or more processors to:

receive the supporting content in the device prior to the occurrence of the movie.

15. The non-transitory medium of claim 11, further comprising, instructions that, when executed by one or more processors of said wearable device, cause the one or more processors to:
  receive a stream of the supporting content in the device during the occurrence of the movie.

* * * * *